(12) United States Patent
Buttolo et al.

(10) Patent No.: US 11,485,303 B2
(45) Date of Patent: Nov. 1, 2022

(54) SYSTEMS AND METHODS FOR PIEZOELECTRIC SENSOR MICROPHONE WINDOW KEYPAD ENTRY

(71) Applicant: Ford Global Technologies, LLC, Dearborn, MI (US)

(72) Inventors: Pietro Buttolo, Dearborn Heights, MI (US); Joshua Wheeler, Trenton, MI (US); Scott Amman, Milford, MI (US); Nicholas Colella, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 17/072,585

(22) Filed: Oct. 16, 2020

(65) Prior Publication Data

US 2022/0118925 A1    Apr. 21, 2022

(51) Int. Cl.
| | | |
|---|---|---|
| *B60R 25/00* | (2013.01) | |
| *B60R 16/037* | (2006.01) | |
| *H04R 7/04* | (2006.01) | |
| *G01H 11/08* | (2006.01) | |
| *B60R 11/02* | (2006.01) | |
| *B60R 11/00* | (2006.01) | |

(52) U.S. Cl.
CPC ...... *B60R 16/0373* (2013.01); *B60R 11/0223* (2013.01); *G01H 11/08* (2013.01); *H04R 7/045* (2013.01); *B60R 2011/0026* (2013.01); *H04R 2499/13* (2013.01)

(58) Field of Classification Search
CPC ........ H04B 1/082; B60R 25/00; B60R 1/0607
USPC ........................................ 381/86; 701/36, 49
See application file for complete search history.

(56) References Cited

U.S. PATENT DOCUMENTS

| | | | |
|---|---|---|---|
| 6,356,641 B1 | 3/2002 | Warnaka et al. | |
| 8,180,065 B2 | 5/2012 | Snider | |
| 10,479,300 B2 | 11/2019 | Wheeler et al. | |
| 2013/0238167 A1* | 9/2013 | Stanfield | ........... E05B 81/56 |
| | | | 701/2 |
| 2016/0118035 A1* | 4/2016 | Hyde | ........ G10K 11/17885 |
| | | | 381/71.6 |

OTHER PUBLICATIONS

Bolzmacher, et al., "Transforming car glass into microphones using piezoelectric transducers", Microsystem Technologies, Jul. 2016, 4 pages, vol. 22, No. 7, ACM Digital Library Association for Computing Machinery.

\* cited by examiner

*Primary Examiner* — George C Monikang
(74) *Attorney, Agent, or Firm* — Frank Lollo; Eversheds Sutherland (US) LLP (57) ABSTRACT

Disclosed are systems and methods that uses a window as a keypad entry system that functions as a replacement for a keyless entry keypad in a vehicle. The system includes a vehicle window functional as a keypad using piezoelectric transducers that capture resonance from the vehicle window when pressure waves (e.g., generated by voice commands or taps) impact the glass. A transducer controller amplifies the vibrations from the vehicle window user tap or spoken commands and triangulates the signal to localize a position of the origination point of the tap, which may be mapped to a respective numeric or cardinal input value. The system may include a low power mode that receives input while the vehicle is off.

17 Claims, 5 Drawing Sheets

SYSTEMS AND METHODS FOR PIEZOELECTRIC SENSOR MICROPHONE WINDOW KEYPAD ENTRY

BACKGROUND

Vehicle users widely appreciate the ability to enter a vehicle using a keypad. They appreciate the convenience of leaving keys inside the vehicle or the ability to enable guests/children to access to the vehicle without giving them the keys.

Keypads are generally disposed on an exterior surface of the vehicle on the door or door pillar. Various types of button interfaces are currently used, which may be susceptible to weather conditions when configured outside of the vehicle. Other input mechanisms, including microphones, may also be utilized in automotive control systems to provide input for various applications associated with automotive operation. Conventional microphone sensors may also be susceptible to weather conditions when configured outside of a vehicle.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Disclosed are systems and methods that uses a window as a microphone as a replacement for keyless entry to a vehicle. Embodiments described herein can include a window keypad entry system that uses a window as a microphone for keyless entry to a vehicle. The system can include a vehicle window configured to operate as a keypad utilizing an array of piezo transducers that capture resonance on an outside surface of the vehicle window when pressure waves from window touches or taps generated by a user impact the vehicle window glass. To recognize the vibration signals, a transducer controller amplifies vibrations from the vehicle window tap to localize the tap relative to a fixed position or control point on the automotive glass.

The window acts as a microphone using the embedded microphone array containing a plurality of piezo transducer microphones that can detect and measure resonance of the surface of the window via pressure waves generated on the window surface by user touches or taps. A transducer controller disposed in communication with the microphone array triangulates the tap locations and associates the locations of each respective tap with a numeric or cardinal Personal Identification Number (PIN) digit in lieu of a normal touchpad PIN on a vehicle. In one example embodiment, the user can tap the window to wake-up the system from a low-power mode and subsequently enter a PIN code on the window glass after it transitions into a high-power mode. In some instances, a keyboard may be projected on the glass and triangulation from the piezo element may be used to locate the position of a press on the glass.

The window keypad entry system may process an initializing tap to the vehicle window while the vehicle is turned off and the system is in the low-power mode using input from the piezo transducers operating as part of the microphone array. In the low-power mode, the window keypad entry system may operate with a low clock speed relative to a power mode that operates at a full clock speed. The low-power mode may also operate with minimum signal amplification to minimize power consumption as compared to a full signal amplification associated with the high-power mode.

The user may engage the window keypad entry system with a tap on the window using a fingertip or object. The piezo transducers of the microphone array may detect the vibration pulse. The transducer controller may switch to the high-power mode responsive to receiving the vibration pulse, where the high-power mode utilizes a full clock speed and full signal amplification. The window keypad entry system may then receive a second tap, a third tap, etc., via the microphone array, decode the location(s) of the taps to determine either a numeric value associated with a tap location or a cardinal location of each respective tap input. The transducer controller may then concatenate the individual cardinal or numeric digits to form a PIN and forward the PIN to the vehicle's body control module to trigger an actuator that may unlock the vehicle responsive to an authenticated PIN code.

The system may include a low-power mode that listens for input while the vehicle is off. In a second high-power mode, the system may detect a voice or tapping event, which may prompt a transition to a wake-up state. In some instances, the system may associate a number and timing of taps with unique user keys, similar to key selections of numbers on a keypad.

In other instances, the system may recognize a verbal input that includes a spoken PIN code. The system may utilize the piezoelectric transducer microphone to receive and amplify speech through vibrations received using the vehicle window glass.

The piezoelectric diaphragm transducer system may allow a secondary use of automotive window glass to function as a keypad for a keyless vehicle entry system. In some aspects, the disclosed system may not rely on capacitive or mechanical buttons disposed on vehicle exterior surfaces that may wear over time and increase vehicle cost.

Moreover, vehicle styling may be improved without unsightly keypad interfaces on the vehicle doors or other surfaces.

In other aspects, the disclosed system may enable additional user-friendly vehicle features without increasing vehicle cost, such as a vehicle security feature where the system recognizes user voice or tapping, then transitions the entry system from a low-power mode to a high-power mode for receiving verbal commands to unlock the vehicle. In other aspects, the system may provide tactile feedback to the user after entry of each digit when the vehicle window tapping feature is utilized.

These and other advantages of the present disclosure are provided in greater detail herein.

Illustrative Embodiments

The disclosure will be described more fully hereinafter with reference to the accompanying drawings, in which example embodiments of the disclosure are shown, and not intended to be limiting.

Figure 1:
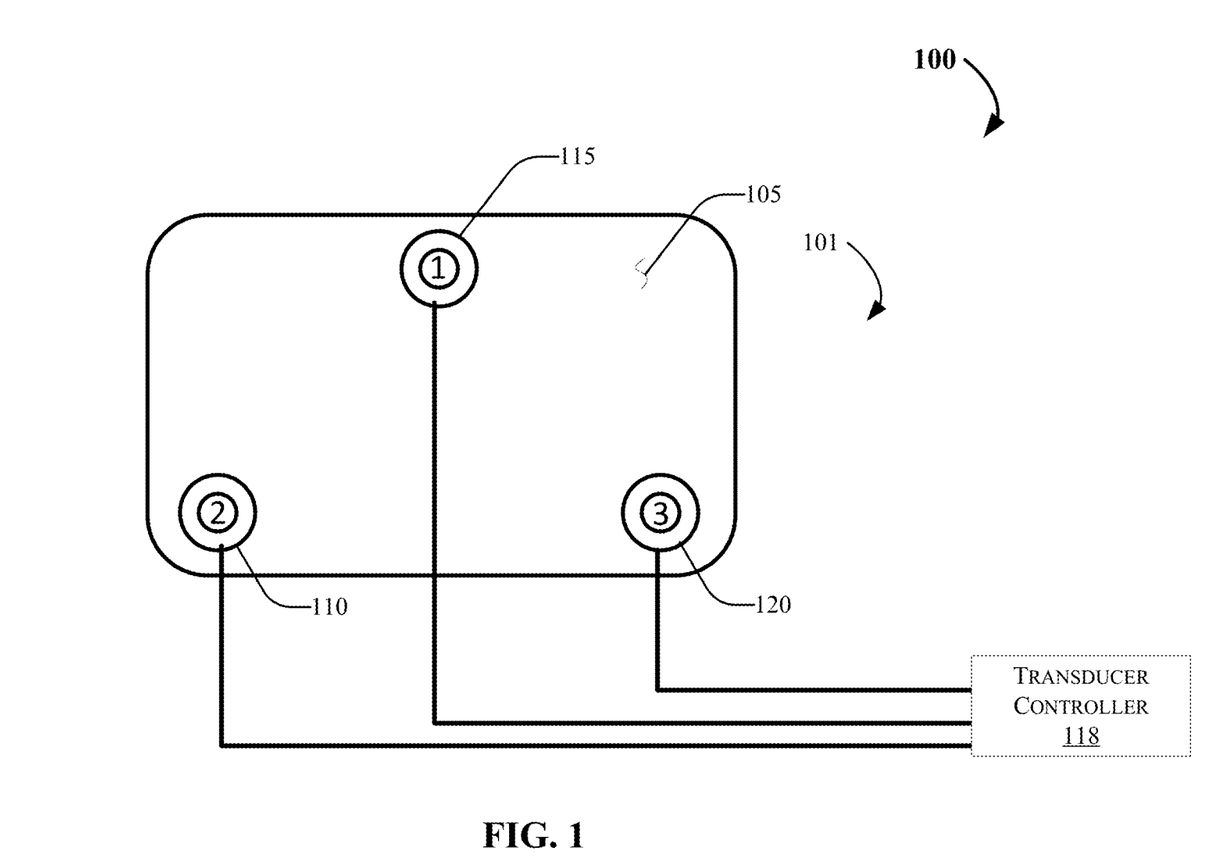
FIG. 1 depicts a piezoelectric diaphragm transducer window keypad system that includes a microphone array having a plurality of piezoelectric diaphragm transducer microphones disposed on a vehicle window in accordance with the present disclosure.

FIG. 1 depicts a piezoelectric diaphragm transducer window keypad system 100 that includes a microphone array 101 having a plurality of piezoelectric diaphragm transducer microphones 110, 115, and 120. The microphone array 101 may be rigidly disposed on an interior surface of the vehicle window 105 at three or more locations.

Figure 2:
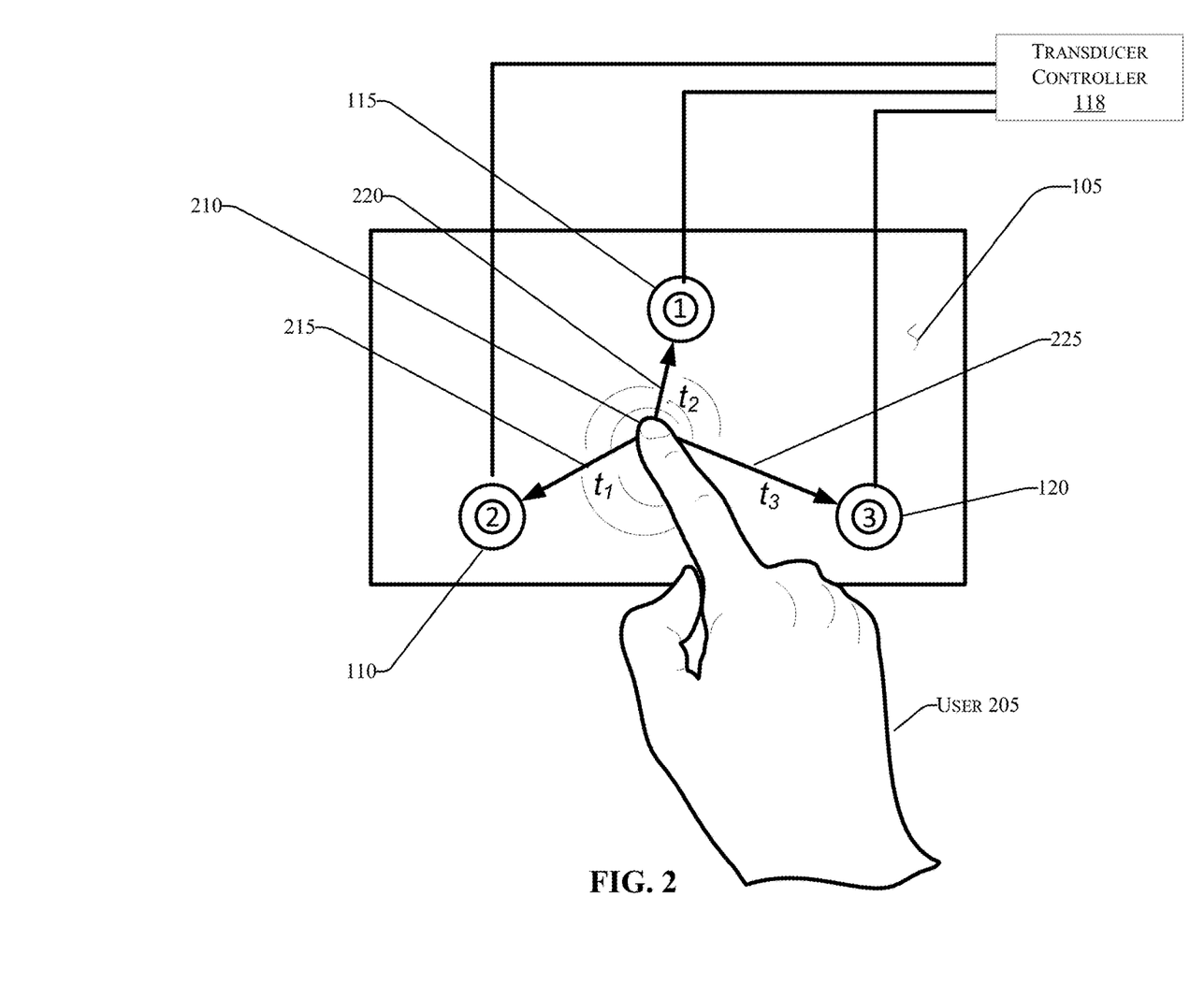
FIG. 2 illustrates a user tapping the vehicle window in accordance with embodiments of the present disclosure.

FIG. 2 illustrates a user 205 tapping the vehicle window 105. As the user 205 taps the vehicle window 105 with a finger or other object, vibration associated with the tap on the vehicle window can travel on the glass medium of the vehicle window 105 from the point of impact 210, since vibration travels through a medium at a given rate that varies with respect to distance traveled. For example, in one example glass medium, the vibratory signals associated with the tap to the vehicle window 105 may travel at a speed of about 5500 meter/second, and may reach each of the three piezoelectric diaphragm transducer microphones 110, 115, and 120 at different times, respectively, depending on the distance traveled from the point of impact 210 to the respective microphones. The transducer controller 118 may receive a vibratory signal from the piezoelectric diaphragm transducer microphones 110, 115, and 120. The time points at which each of the three signals (215, 220, and 225) received from the piezoelectric diaphragm transducer microphones (110, 115, and 120, respectively) are referred to herein as $t_1$, $t_2$, and $t_3$. It should be appreciated that $t_1$, $t_2$, and $t_3$ are not the times it takes to travel from the point of impact 210 to each respective piezoelectric diaphragm transducer microphone, but rather a time reference indicative of a respective time of arrival.

Given a known time of arrival, the following system of equations must then be true, with $x_1$, $y_1$, $x_2$, $y_2$, $x_3$, $y_3$, $t_1$, $t_2$, and $t_3$ being known variables, $x_T$, $y_T$, $t_0$ being unknown variables, and v a measurable parameter, such that, $$\frac{\sqrt{(x_T - x_1)^2 + (y_T - y_1)^2}}{v} = t_1 - t_0$$

$$\frac{\sqrt{(x_T - x_2)^2 + (y_T - y_2)^2}}{v} = t_2 - t_0$$

$$\frac{\sqrt{(x_T - x_3)^2 + (y_T - y_3)^2}}{v} = t_3 - t_0$$

In one aspect, the transducer controller 118 may solve for the unknown variables $x_T$, $y_T$, $t_0$ being unknown variables, and the measurable parameter v known methods, such that the transducer controller 118 may determine a location of a tap on the vehicle window 105.

Figure 3:
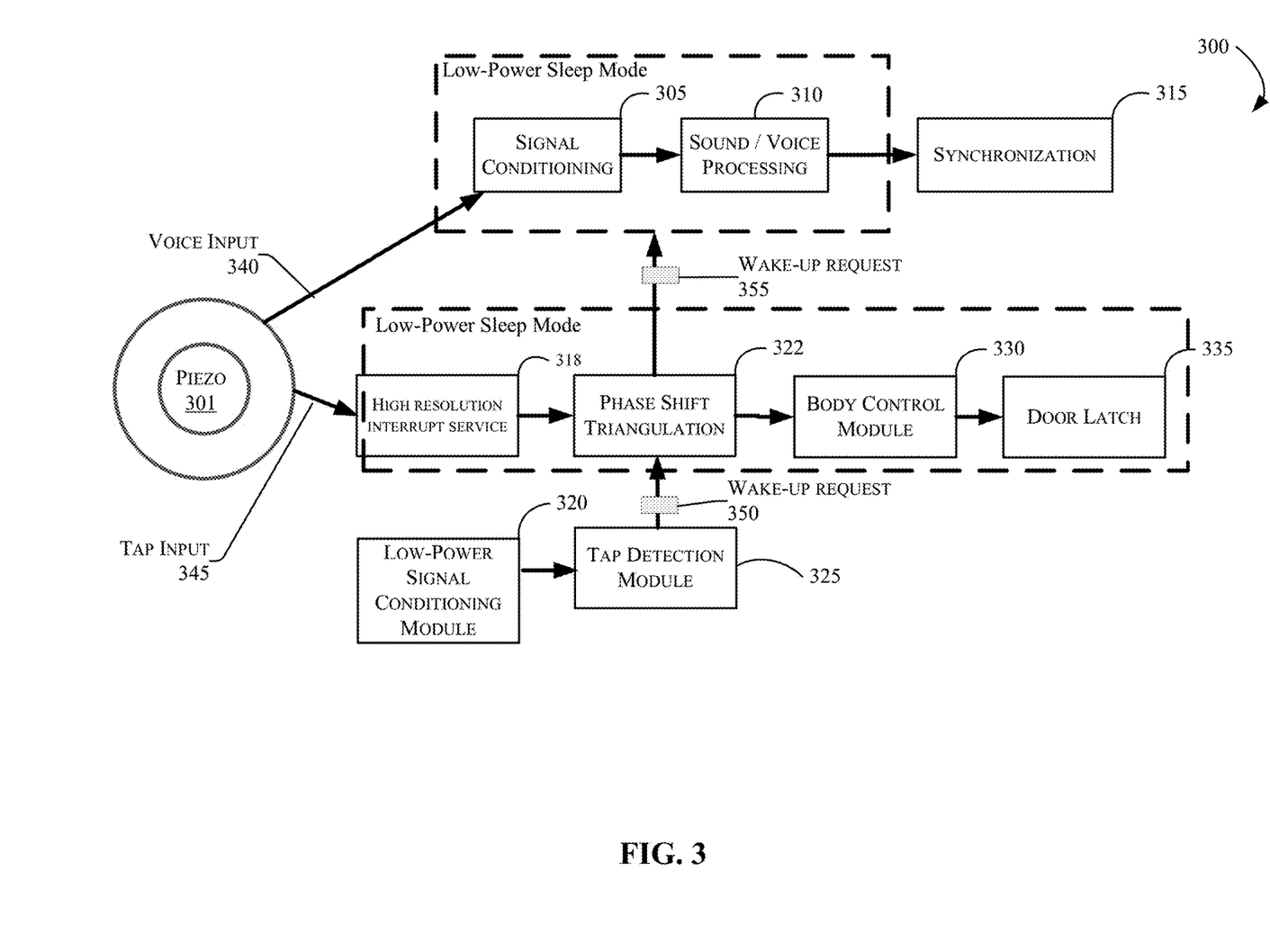
FIG. 3 illustrates an example flow diagram for using a piezoelectric diaphragm transducer window keypad system to provide user access to a vehicle in accordance with embodiments of the present disclosure.

FIG. 3 illustrates an example process diagram 300 for using a piezoelectric diaphragm transducer window keypad system 100 to provide user access to a vehicle (not shown in FIG. 3), in accordance with example embodiments of this disclosure.

To recognize sound external to the vehicle, including voice commands, a vibratory signal must be amplified to a sufficient level for processing onboard the vehicle. This type of processing may require a level of power consumption that would drain the vehicle battery (not shown in FIG. 3) if signal conditioning circuitry (e.g., a tap detection module 325) and a sound/voice processing module 310 were left running while the vehicle is keyed off.

The piezoelectric diaphragm transducer microphones 110-120 may communicate the vibratory signals 215-220 (as shown in FIG. 2) with a tap detection module 325 and a low-power signal conditioning module 320. The process 300 may use the piezoelectric diaphragm transducer microphone(s) 301 (which may be substantially similar or identical to the piezoelectric diaphragm transducer microphones 110-120 depicted with respect to FIGS. 1 and 2) to receive tap inputs 345 and voice inputs 340 resonating through automotive glass (e.g., the vehicle window 105) to provide vehicle access. In some instances, the piezoelectric diaphragm transducer microphone 301 can be any one or a combination of the piezoelectric diaphragm transducer microphones 110-120. The piezoelectric diaphragm transducer microphone(s) 301 may be or include a transducer assembly configured to act as a weather-resistant solid-state microphone device that is mountable on a vehicle interior or exterior, in locations that may normally be unsuitable for microphones or other input devices, such as the engine compartment, or in the present embodiment, automotive glass. The transducer assembly may include a piezoelectric actuator (not shown in FIG. 3), such as the type conventionally used in small consumer electronics to produce beeps, chirps, or other sound output, or may be configured as another type of piezoelectric microphone unit. The piezoelectric diaphragm transducer microphones 110-120 may be rigidly mountable to a resonating surface such as the vehicle window 105 (as shown in FIGS. 1 and 2), and may be programmed to use the vehicle window to receive sound vibrations and taps that cause the piezoelectric diaphragm transducer microphone(s) 301 to produce the piezo transducer signals (e.g., the vibratory signals 215-225) for processing by an automotive computer (not shown in FIG. 3) using the tap detection module 325 and/or the low-power signal conditioning module 320.

The piezoelectric diaphragm transducer microphone(s) 301 may detect vibration inputs through the automotive glass of the vehicle window 105 (as shown in FIGS. 1 and 2) that cause the piezoelectric diaphragm transducer window keypad system 100 to utilize one or more of two logical paths using the piezo transducer signal. The upper-most process blocks include the signal conditioning module 305 and a sound/voice processing module 310, which may be maintained in a low-power or dormant state while the vehicle is keyed off. The second path, shown on the bottom row of FIG. 3, includes a high resolution interrupt service 318, a phase shift triangulation module 322, a body control module (BCM) 330 in communication with the phase shift triangulation module 322, and a door latch mechanism 335 disposed in communication with the BCM 330.

In some aspects, the piezoelectric diaphragm transducer microphone(s) 301 may be tuned and/or programmed to detect finger tapping on the vehicle windows in proximity of the piezoelectric diaphragm transducer microphones 110-120. Because the vibrations/sound waves associated with a tap on the glass are considerably stronger (e.g., having a higher amplitude) as compared to vibration induced by spoken sound waves, the piezoelectric diaphragm transducer window keypad system 100 may require a significantly lower power requirement to power the standby processor (not shown in FIG. 3) associated with the low-power signal conditioning module 320. The tap detection module 325 may require significantly less power to detect and/or process a window tap, and therefore the signal conditioning module may be kept active while the vehicle is off.

In an example embodiment, the low-power signal conditioning module 320 may receive a tap input 345. Responsive to receiving the tap input (which may also be considered a wake-up signal), the tap detection module 325 may transmit a wake-up request 350 to the phase shift triangulation module 322, which may then perform the calculations described with respect to FIG. 2.

In another embodiment, responsive to the vibration processing module 325 detecting a tapping event, it may send a request message 355 to wake-up the sound/voice processing module 310. Once awake and in a high-power mode, the sound/voice processing module 310 may allow the user to enter request input by voice. In other aspects, responsive to recognizing a known sequence of taps or verbal utterances associated with a valid PIN code, the vehicle may trigger the body control module 330 to provide access to the vehicle by triggering an unlock action via the door latch mechanism 335.

It may be challenging to reflect a virtual keypad onto a surface of the vehicle window 105. The widespread use of smartphones has shown that users may be comfortable with swipe patterns associated with locking and unlocking mobile devices. In one example embodiment, instead of tapping numerical digits on a virtual window keypad, a user may wish to memorize a code in a easy to remember cardinal direction format, such as NSWEC (North, South, West, East, Center). FIGS. 4A, 4B, 4C, 4D, 4E, and 4F depict views of cardinal taps at locations on the vehicle window 105 that may be measured with respect to a location of an initializing tap location 400, according to example embodiments of the present disclosure.

Figure 4A:
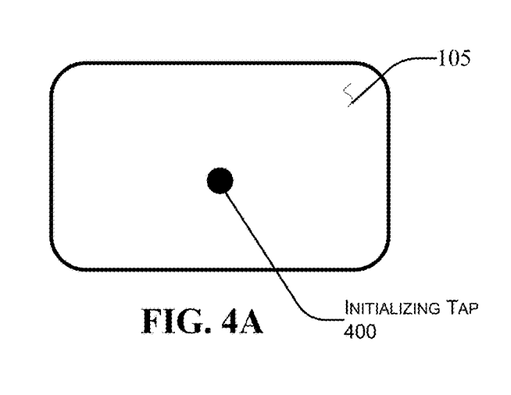
FIGS. 4A, 4B, 4C, 4D, 4E, and 4F depict views of cardinal taps at locations on the vehicle window that may be measured with respect to a location of an initializing tap location according to example embodiments of the present disclosure.

Referring first to FIG. 4A, the user 205 (not shown in FIGS. 4A-4E) may activate the piezoelectric diaphragm transducer window keypad system 100 in keypad mode by tapping anywhere on the window (as described with respect to FIG. 3, for example), which may enable wake-up features in the transducer controller 118 for fast interrupt processing needed for triangulation.

In one aspect, the transducer controller 118 may associate a series of taps (shown in FIGS. 4B-4F), which may be respectively measured relative to an initializing tap 400, to concatenate the cardinal directions into a string of information that may be associated with a unique PIN.

For example, FIG. 4A depicts an initializing tap 400, which may be used as a control point from which other taps are directionally measured.

Figure 4B:
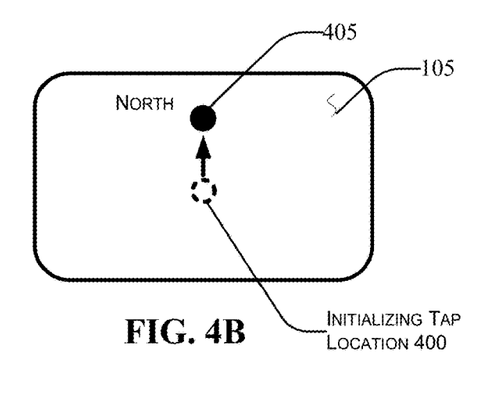
Figure 4C:
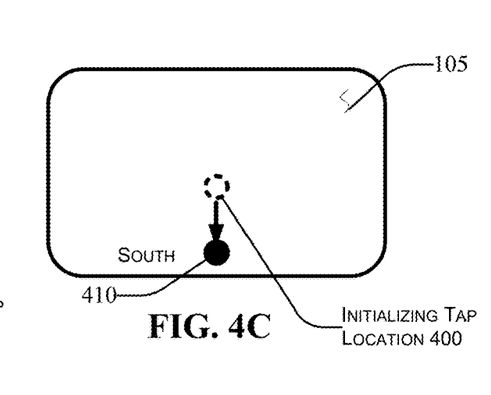
Figure 4D:
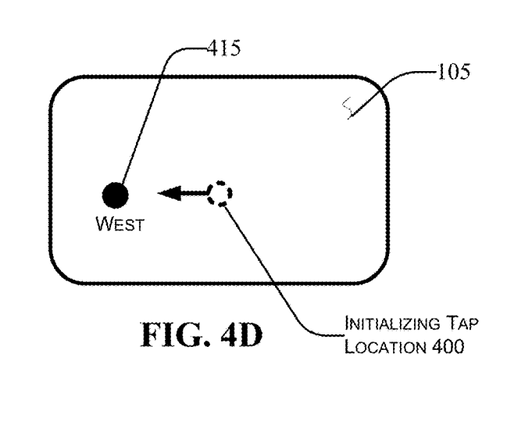
Figure 4E:
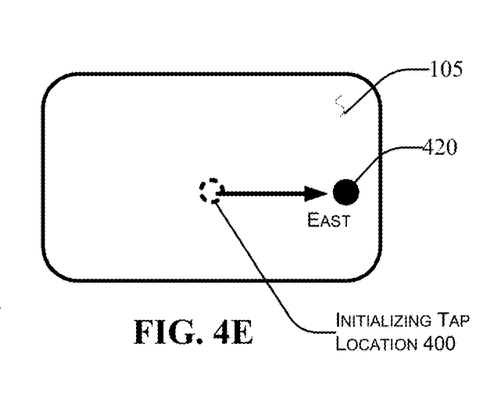

As shown in FIG. 4B, to enter the symbol NORTH, the user may tap the window north of the initializing tap location 400 (with north being up relative to the initializing tap location 400, as shown as tap 405 in FIG. 4B). Similarly, as shown in FIG. 4C, a SOUTH tap 410 is depicted, and in FIG. 4D a WEST tap 415 is shown. FIG. 4E depicts an EAST tap 420.

Figure 4F:
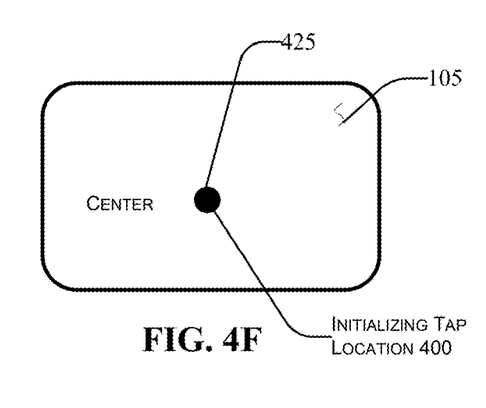

The CENTER tap 425 cardinal input tap may be entered by tapping on the same location (or approximately same location) as the initializing tap location 400.

According to an embodiment, a user may enter a series of cardinal location taps that form a unique pattern which the transducer controller 118 may use to generate a unique PIN string that may be sent to the BCM for user authentication that may trigger vehicle access.

Figure 5:
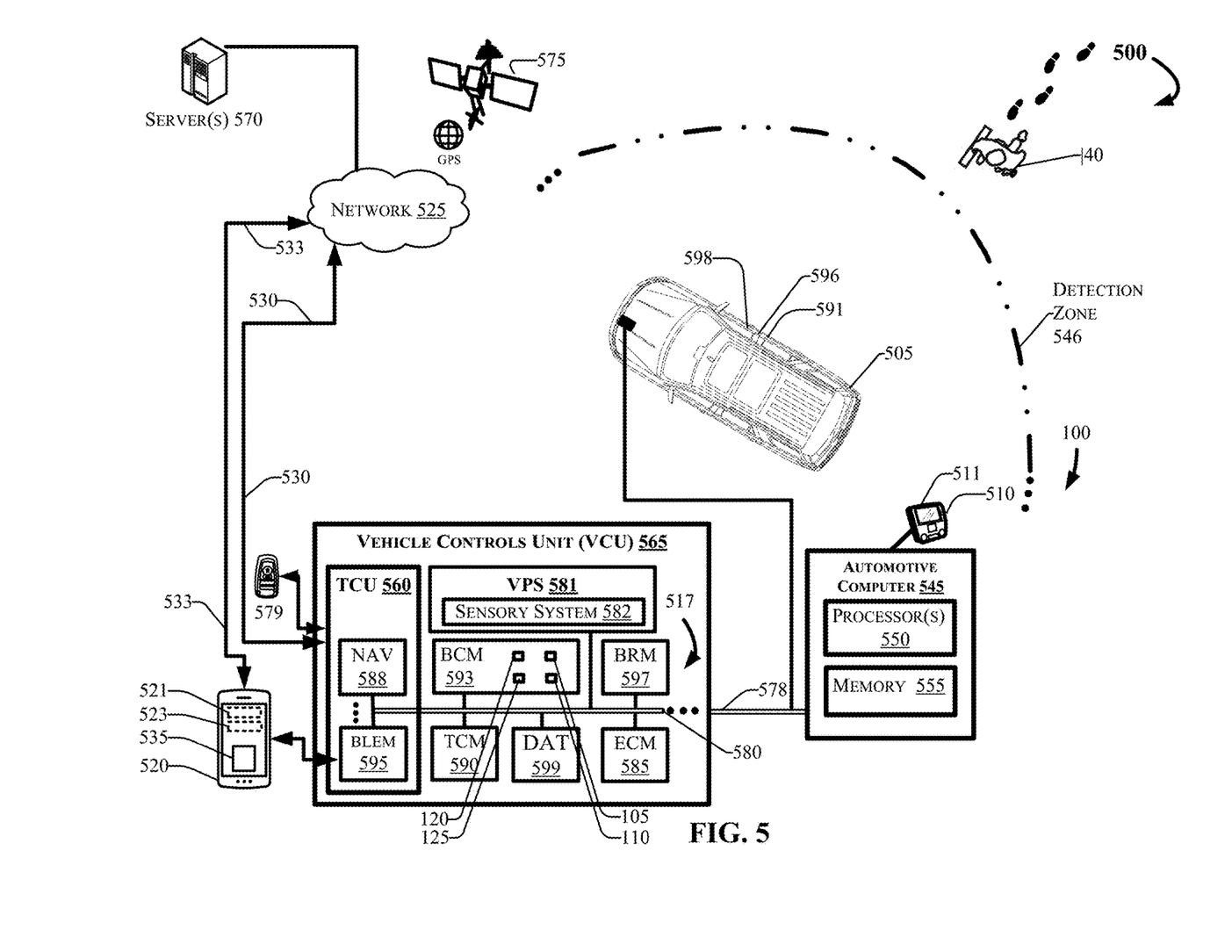
FIG. 5 depicts an example computing environment that can include a vehicle according to example embodiments of the present disclosure.

FIG. 5 depicts an example computing environment 500 that can include a vehicle 505. The vehicle 505 may include an automotive computer 545, and a Vehicle Controls Unit (VCU) 565 that can include a plurality of electronic control units (ECUs) 517 disposed in communication with the automotive computer 545. A mobile device 520, which may be associated with the user 205 and the vehicle 505, may connect with the automotive computer 545 using wired and/or wireless communication protocols and transceivers. The mobile device 520 may be communicatively coupled with the vehicle 505 via one or more network(s) 525, which may communicate via one or more wireless connection(s) 530, and/or may connect with the vehicle 505 directly using near field communication (NFC) protocols, Bluetooth® protocols, Wi-Fi, Ultra-Wide Band (UWB), and other possible data connection and sharing techniques.

The vehicle 505 may also receive and/or be in communication with a Global Positioning System (GPS) 575. The GPS 575 may be a satellite system (as depicted in FIG. 4) such as the global navigation satellite system (GLNSS), Galileo, or navigation or other similar system. In other aspects, the GPS 575 may be a terrestrial-based navigation network. In some embodiments, the vehicle 505 may utilize a combination of GPS and Dead Reckoning responsive to determining that a threshold number of satellites are not recognized.

The automotive computer 545 may be or include an electronic vehicle controller, having one or more processor(s) 550 and memory 555. The automotive computer 545 may, in some example embodiments, be disposed in communication with the mobile device 520, and one or more server(s) 570. The server(s) 570 may be part of a cloud-based computing infrastructure, and may be associated with and/or include a Telematics Service Delivery Network (SDN) that provides digital data services to the vehicle 505 and other vehicles (not shown in FIG. 4) that may be part of a vehicle fleet.

Although illustrated as a sport utility, the vehicle 505 may take the form of another passenger or commercial automobile such as, for example, a car, a truck, high performance vehicle, a crossover vehicle, a van, a minivan, a taxi, a bus, etc., and may be configured and/or programmed to include various types of automotive drive systems. Example drive systems can include internal combustion engine (ICEs) powertrains having a gasoline, diesel, or natural gas-powered combustion engine with conventional drive components such as, a transmission, a drive shaft, a differential, etc.

In another configuration, the vehicle 505 may be configured as an electric vehicle (EV). More particularly, the vehicle 505 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 505 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 505 may be a manually driven vehicle, and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

The mobile device 520 can include a memory 523 for storing program instructions associated with an application 535 that, when executed by a mobile device processor 521, performs aspects of the disclosed embodiments. The application (or "app") 535 may be part of the Piezoelectric diaphragm transducer window keypad system 100, or may provide information to the Piezoelectric diaphragm transducer window keypad system 100 and/or receive information from the Piezoelectric diaphragm transducer window keypad system 100.

In some aspects, the mobile device 520 may communicate with the vehicle 505 through the one or more wireless connection(s) 530, which may be encrypted and established between the mobile device 520 and a Telematics Control Unit (TCU) 560. The mobile device 520 may communicate with the TCU 560 using a wireless transmitter (not shown in FIG. 4) associated with the TCU 560 on the vehicle 505. The transmitter may communicate with the mobile device 520 using a wireless communication network such as, for example, the one or more network(s) 525. The wireless connection(s) 530 are depicted in FIG. 4 as communicating via the one or more network(s) 525, and via one or more wireless connection(s) 533 that can be direct connection(s) between the vehicle 505 and the mobile device 520. The wireless connection(s) 533 may include various low-energy protocols including, for example, Bluetooth®, Bluetooth® Low-Energy (BLE®), UWB, Near Field Communication (NFC), or other protocols.

The network(s) 525 illustrate an example communication infrastructure in which the connected devices discussed in various embodiments of this disclosure may communicate. The network(s) 525 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 545 may be installed in an engine compartment of the vehicle 505 (or elsewhere in the vehicle 505) and operate as a functional part of the Piezoelectric diaphragm transducer window keypad system 100, in accordance with the disclosure. The automotive computer 545 may include one or more processor(s) 550 and a computer-readable memory 555.

The one or more processor(s) 550 may be disposed in communication with one or more memory devices disposed in communication with the respective computing systems (e.g., the memory 555 and/or one or more external databases not shown in FIG. 5). The processor(s) 550 may utilize the memory 555 to store programs in code and/or to store data for performing aspects in accordance with the disclosure. The memory 555 may be a non-transitory computer-readable memory storing a keyless vehicle access program code. The memory 555 can include any one or a combination of volatile memory elements (e.g., dynamic random access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. In some aspects, the memory 555 may include a Piezoelectric diaphragm transducer window keypad system 100.

The VCU 565 may share a power bus 578 with the automotive computer 545, and may be configured and/or programmed to coordinate the data between vehicle 505 systems, connected servers (e.g., the server(s) 570), and other vehicles (not shown in FIG. 5) operating as part of a vehicle fleet. The VCU 565 can include or communicate with any combination of the ECUs 517, such as, for example, a Body Control Module (BCM) 593, an Engine Control Module (ECM) 585, a Transmission Control Module (TCM) 590, the TCU 560, a Driver Assistance Technologies (DAT) controller 599, etc. The VCU 565 may further include and/or communicate with a Vehicle Perception System (VPS) 581, having connectivity with and/or control of one or more vehicle sensory system(s) 582. In some aspects, the VCU 565 may control operational aspects of the vehicle 505, and implement one or more instruction sets received from the application 535 operating on the mobile device 520, from one or more instruction sets stored in computer memory 555 of the automotive computer 545, including instructions operational as part of the Piezoelectric diaphragm transducer window keypad system 100.

The TCU 560 can be configured and/or programmed to provide vehicle connectivity to wireless computing systems onboard and offboard the vehicle 505, and may include a Navigation (NAV) receiver 588 for receiving and processing a GPS signal from the GPS 575, a BLE® Module (BLEM) 595, a Wi-Fi transceiver, a UWB transceiver, and/or other wireless transceivers (not shown in FIG. 5) that may be configurable for wireless communication between the vehicle 505 and other systems, computers, and modules. The TCU 560 may be disposed in communication with the ECUs 517 by way of a bus 580. In some aspects, the TCU 560 may retrieve data and send data as a node in a CAN bus.

The BLEM 595 may establish wireless communication using Bluetooth® and BLE® communication protocols by broadcasting and/or listening for broadcasts of small advertising packets, and establishing connections with responsive devices that are configured according to embodiments described herein. For example, the BLEM 595 may include Generic Attribute Profile (GATT) device connectivity for client devices that respond to or initiate GATT commands and requests, and connect directly with the mobile device 520, and/or one or more keys (which may include, for example, the fob 579).

The bus 580 may be configured as a Controller Area Network (CAN) bus organized with a multi-master serial bus standard for connecting two or more of the ECUs 517 as nodes using a message-based protocol that can be configured and/or programmed to allow the ECUs 517 to communicate with each other. The bus 580 may be or include a high speed CAN (which may have bit speeds up to 1 Mb/s on CAN, 5

Mb/s on CAN Flexible Data Rate (CAN FD)), and can include a low-speed or fault tolerant CAN (up to 125 Kbps), which may, in some configurations, use a linear bus configuration. In some aspects, the ECUs 517 may communicate with a host computer (e.g., the automotive computer 545, the Piezoelectric diaphragm transducer window keypad system 100, and/or the server(s) 570, etc.), and may also communicate with one another without the necessity of a host computer. The bus 580 may connect the ECUs 517 with the automotive computer 545 such that the automotive computer 545 may retrieve information from, send information to, and otherwise interact with the ECUs 517 to perform steps described according to embodiments of the present disclosure. The bus 580 may connect CAN bus nodes (e.g., the ECUs 517) to each other through a two-wire bus, which may be a twisted pair having a nominal characteristic impedance. The bus 580 may also be accomplished using other communication protocol solutions, such as Media Oriented Systems Transport (MOST) or Ethernet. In other aspects, the bus 580 may be a wireless intra-vehicle bus.

The VCU 565 may control various loads directly via the bus 580 communication or implement such control in conjunction with the BCM 593. The ECUs 517 described with respect to the VCU 565 are provided for example purposes only, and are not intended to be limiting or exclusive. Control and/or communication with other control modules not shown in FIG. 5 is possible, and such control is contemplated.

In an example embodiment, the ECUs 517 may control aspects of vehicle operation and communication using inputs from human drivers, inputs from an autonomous vehicle controller, the Piezoelectric diaphragm transducer window keypad system 100, and/or via wireless signal inputs received via the wireless connection(s) 533 from other connected devices such as the mobile device 520, among others. The ECUs 517, when configured as nodes in the bus 580, may each include a central processing unit (CPU), a CAN controller, and/or a transceiver (not shown in FIG. 5). For example, although the mobile device 520 is depicted in FIG. 5 as connecting to the vehicle 505 via the BLEM 595, it is possible and contemplated that the wireless connection 533 may also or alternatively be established between the mobile device 520 and one or more of the ECUs 517 via the respective transceiver(s) associated with the module(s).

The BCM 593 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 593 may also operate as a gateway for bus and network interfaces to interact with remote ECUs (not shown in FIG. 5). In one aspect, the BCM 593 may include and/or operate a transducer controller.

The BCM 593 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 130 may be configured for vehicle energy management, exterior lighting control, wiper functionality, power window and door functionality, heating ventilation and air conditioning systems, and driver integration systems. In other aspects, the BCM 593 may control auxiliary equipment functionality, and/or be responsible for integration of such functionality.

Although the present embodiments are configured such that a keypad entry system may not be needed, in some aspects, the vehicle 505 may include one or more Door Access Panels (DAPs) 591 disposed on exterior door surface(s) of vehicle door(s) 598, and connected with a DAP controller (not shown in FIG. 5). In some aspects, the user 205 may have the option of entering a vehicle by typing in a personal identification number (PIN) on an exterior interface associated with a vehicle. The user interface may be included as part of a Door Access Panel (DAP) 591, a wireless keypad, included as a part of the mobile device 520, or included as part of another interface. The DAP 591, which may operate and/or communicate with the BCM 593 or another of the ECUs 517, can include and/or connect with an interface with which a ridehail passenger, user, (or any other user such as the user 205) may input identification credentials and receive information from the system. In one aspect, the interface may be or include a DAP 591 disposed on a vehicle door 598, and can include an interface device from which the user can interact with the system by selecting their unique identifier from a list, and by entering personal identification numbers (PINs) and other non-personally identifying information. In some embodiments, the interface may be a mobile device, a keypad, a wireless or wired input device, a vehicle infotainment system, and/or the like. In other embodiments described herein, the interface may be the automotive glass configured as a virtual keypad. Accordingly, it should be appreciated that, although a DAP is described with respect to embodiments herein, the interface may alternatively be one or more other types of interfaces described above.

The BCM 593, can include sensory and processor functionality and hardware to facilitate user and device authentication, and provide occupant customizations and support that provide customized experiences for vehicle occupants. The BCM 130 may connect with a Driver Assistance Technologies (DAT) controller 599 configured and/or programmed to provide biometric authentication controls, including, for example, facial recognition, fingerprint recognition, voice recognition, and/or other information associated with characterization, identification, and/or verification for other human factors such as gait recognition, body heat signatures, eye tracking, etc. In some aspects, the BCM 593 may include communication with a macrocapacitive sensor system that may determine when the user 205 is approaching the vehicle, and responsive to determining that approach (or proximity to the vehicle 505), transition one or more systems from a low power state to a high power state.

The processor(s) 550 may provide initial access to the vehicle 505 when the mobile device 520 is within the detection zone 546 (also referred to herein as a Passive Entry Passive Start (PEPS) zone). Determining that the mobile device 520 is proximate to the vehicle 505 and within the PEPS zone 546, in conjunction with one or more other triggers, may cause pre-authorization steps to begin. For example, the processor(s) 550 may generate a secure processor initialization instruction responsive to a door latch opening, or a user touching the sensory area of a door handle or keyless entry keypad, or presence detection through cameras or other electromagnetic sensing. The processor(s) 550 may receive a sensor output that indicates an attempt to enter the vehicle.

The handle touch, by itself, would not trigger an unlock instruction. Rather, in an example embodiment, the touch to the door handle 596, plus the proximity indication associated with the position of the mobile device 520 with respect to the vehicle 505, may cause a door handle sensor (not shown in FIG. 5) to transmit sensor output to the processor(s) 550. The processor(s) 550 may receive the vehicle sensor output associated with the actuation of the door handle 596 (and more precisely, associated with an actuation of a door latch mechanism (not shown in FIG. 5) of the door handle 596), and generate a secure processor initialization instruction to the processor(s) 550 in response.

The processor(s) 550 may also provide access to the vehicle 505 in conjunction with the processor(s) 550 by unlocking the door 598, based on the key-on request and/or the authentication message (key-on request and authentication message not shown in FIG. 5) stored in the cache memory of the automotive computer 545. The secure processor initialization instruction may initialize the processor(s) 550, by sending instructions that "wake up" the processor(s) 550 by changing a power mode profile from a low-energy state to a higher-energy state. Once initialized, the processor(s) 550 may verify the authentication message (not shown in FIG. 5) stored in the cache memory of the automotive computer 545 before unlocking the door 598.

The computing system architecture of the automotive computer 545, VCU 565, and/or the piezoelectric diaphragm transducer window keypad system 100 may omit certain computing modules. It should be readily understood that the computing environment depicted in FIG. 5 is an example of a possible implementation according to the present disclosure, and thus, it should not be considered limiting or exclusive.

The automotive computer 545 may connect with an infotainment system 510 that may provide an interface for the navigation and GPS receiver 588, and the piezoelectric diaphragm transducer window keypad system 100. The infotainment system 510 may include a touchscreen interface portion 511, and may include voice recognition features, biometric identification capabilities that can identify users based on facial recognition, voice recognition, fingerprint identification, or other biological identification means. In other aspects, the infotainment system 510 may provide user identification using mobile device pairing techniques (e.g., connecting with the mobile device 520, a PIN code, a password, passphrase, or other identifying means.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for unlocking a vehicle via a window keypad system, comprising:
   receiving, responsive to an initializing tap on a window, a first vibratory signal via a microphone array disposed on the window;
   receiving, via the microphone array, a second vibratory signal associated with a second tap to the window;
   localizing the second tap based on the second vibratory signal; and
   unlocking a door of the vehicle based at least on the second tap,
   wherein localizing the second tap comprises triangulating the second vibratory signal via the microphone array, and wherein triangulating the second vibratory signal comprises:
      determining a first arrival time of the second vibratory signal at a first piezoelectric diaphragm transducer microphone;
      determining a second arrival time of the second vibratory signal at a second piezoelectric diaphragm transducer microphone;

determining a third arrival time of the second vibratory signal at a third piezoelectric diaphragm transducer microphone; and determining, based on the first arrival time, the second arrival time, and the third arrival time, a location of the second tap on the window.

2. The method according to claim 1, further comprising:
determining, based on a location of the second tap on the window, a numeric digit associated with the location of the second tap;
determining, based on the numeric digit associated with the second tap, authentication for vehicle entry.

3. The method according to claim 1, wherein localizing the second tap comprises:
localizing an initializing tap location for the initializing tap on the window;
localizing a second tap location on the window relative to the initializing tap location; and
assigning a relative cardinal location of the second tap relative to the initializing tap location.

4. The method according to claim 1, further comprising:
modifying a power state of the microphone array responsive to receiving the first vibratory signal; and
localizing the second tap responsive to modifying the power state.

5. The method according to claim 4, wherein modifying the power state of the microphone array comprises:
operating a transducer controller disposed in communication with the microphone array in a low-power state;
receiving, at the transducer controller, the first vibratory signal via the microphone array;
transitioning the transducer controller to a high-power state responsive to receiving the first vibratory signal;
receiving the second vibratory signal while in the high-power state; and
determining a location of the second tap on the window via the microphone array.

6. The method according to claim 1, wherein the second tap to the window is one tap of a plurality of localized window taps associated with a Personal Identification Number (PIN) code.

7. A window keypad system for a vehicle, comprising:
a microphone array comprising a plurality of piezoelectric diaphragm transducer microphones; and
a transducer controller disposed in communication with the microphone array, the transducer controller configured to:
receive, via the microphone array and responsive to an initializing tap on a vehicle window, a first vibratory signal;
receive, via the microphone array and responsive to a second tap on the vehicle window, a second vibratory signal;
localize, based on the second vibratory signal, the second tap;
cause, based at least on the localized second tap, a door of the vehicle to be unlocked;
modify a power state of the microphone array responsive to receiving the first vibratory signal; and
localize the second tap responsive to modifying the power state.

8. The system according to claim 7, wherein the transducer controller is configured to determine a location of the second tap on the vehicle window via the microphone array.

9. The system according to claim 8, wherein the microphone array comprises a first piezoelectric diaphragm transducer microphone, a second piezoelectric diaphragm transducer microphone, and a third piezoelectric diaphragm transducer microphone, and wherein the transducer controller is configured to:
determine a first arrival time of the second vibratory signal at the first piezoelectric diaphragm transducer microphone;
determine a second arrival time of the second vibratory signal at the second piezoelectric diaphragm transducer microphone;
determine a third arrival time of the second vibratory signal at the third piezoelectric diaphragm transducer microphone; and
determine, based on the first arrival time, the second arrival time, and the third arrival time, the location of the second tap on the vehicle window.

10. The system according to claim 7, wherein the transducer controller is configured to:
determine, based on a location of the second tap on the vehicle window, a numeric digit associated with the location of the second tap; and
determine, based on the numeric digit associated with the second tap, authentication for vehicle entry.

11. The system according to claim 7, wherein the transducer controller is configured to:
localize a second tap location on the vehicle window relative to a location of the initializing tap to the vehicle window; and
assign a relative cardinal location of the second tap relative to the localized second tap.

12. The system according to claim 7, wherein the transducer controller is configured to:
operate the transducer controller in a low-power state;
receive the first vibratory signal via the plurality of piezoelectric diaphragm transducer microphones;
transition the transducer controller to a high-power state responsive to receiving the first vibratory signal;
receive the second vibratory signal while in the high-power state; and
determine a location of the second tap on the vehicle window via the plurality of piezoelectric diaphragm transducer microphones.

13. The system according to claim 7, wherein the second tap to the vehicle window is one tap of a plurality of localized window taps associated with a Personal Identification Number (PIN) code.

14. A non-transitory computer-readable storage medium having instructions stored thereupon which, when executed by a processor, cause the processor to:
receive, responsive to an initializing tap on a window of a vehicle, a first vibratory signal via a microphone array disposed on the window;
receive, via the microphone array, a second vibratory signal associated with a second tap on the window;
localize, based on the second vibratory signal, the second tap;
unlock, based at least on the second tap, a door of the vehicle;
determine, based on a location of the second tap on the window, a numeric digit associated with the location of the second tap; and
determine, based at least in part on the numeric digit associated with the second tap, authentication for vehicle entry.

15. The storage medium according to claim 14, having further instructions stored thereupon to triangulate a second tap location.

16. The storage medium according to claim 15, having further instructions stored thereupon to:
- determine a first arrival time of the second vibratory signal at a first piezoelectric diaphragm transducer microphone;
- determine a second arrival time of the second vibratory signal at a second piezoelectric diaphragm transducer microphone;
- determine a third arrival time of the second vibratory signal at a third piezoelectric diaphragm transducer microphone; and
- determine, based on the first arrival time, the second arrival time, and the third arrival time, the second tap location on the window.

17. A method for unlocking a vehicle via a window keypad system, comprising:
- receiving, responsive to an initializing tap on a window, a first vibratory signal via a microphone array disposed on the window;
- receiving, via the microphone array, a second vibratory signal associated with a second tap to the window;
- localizing the second tap based on the second vibratory signal; and
- unlocking a door of the vehicle based at least on the second tap,
- wherein localizing the second tap comprises:
  - localizing an initializing tap location for the initializing tap on the window;
  - localizing a second tap location on the window relative to the initializing tap location; and
  - assigning a relative cardinal location of the second tap relative to the initializing tap location.

* * * * *